United States Patent
Bowen

(10) Patent No.: US 6,428,438 B1
(45) Date of Patent: Aug. 6, 2002

(54) HYBRID AUTOMATED MANUAL TRANSMISSION

(75) Inventor: Thomas C. Bowen, Rochester Hills, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/626,305

(22) Filed: Jul. 26, 2000

(51) Int. Cl.[7] .................................................. F16H 3/72
(52) U.S. Cl. .......................................................... 475/5
(58) Field of Search ............................. 473/5, 151, 198, 473/218, 219, 221; 180/65.2, 65.6, 65.7

(56) References Cited

U.S. PATENT DOCUMENTS

| | | | | |
|---|---|---|---|---|
| 3,468,192 A | * | 9/1969 | Nasvytis ...................... 475/218 |
| 4,200,006 A | * | 4/1980 | Ehrlinger et al. ............ 475/218 |
| 4,211,313 A | * | 7/1980 | Quick et al. ................. 192/4 A |
| 4,423,794 A | * | 1/1984 | Beck ........................... 475/5 X |
| 5,351,569 A | * | 10/1994 | Trick et al. ............. 475/207 X |
| 5,433,282 A | * | 7/1995 | Moroto et al. .............. 180/65.2 |
| 5,495,906 A | * | 3/1996 | Furutani .................... 180/65.2 |
| 5,669,842 A | | 9/1997 | Schmidt |
| 5,819,601 A | * | 10/1998 | Kuhn .......................... 74/745 |
| 5,856,709 A | * | 1/1999 | Ibaraki et al. ............... 475/5 X |
| 5,895,333 A | * | 4/1999 | Morisawa et al. ............. 475/5 |
| 5,931,757 A | | 8/1999 | Schmidt |
| 6,119,799 A | * | 9/2000 | Morisawa et al. ......... 180/65.2 |
| 6,146,302 A | * | 11/2000 | Kashiwase ...................... 475/5 |
| 6,244,368 B1 | * | 6/2001 | Ando et al. ................ 180/65.2 |

* cited by examiner

*Primary Examiner*—Rodney H Bonck
*Assistant Examiner*—Roger Pang
(74) *Attorney, Agent, or Firm*—Harness, Dickey & Pierce P.L.C.

(57) ABSTRACT

A split path transmission is provided which is operable by an electric motor/generator and a combustion engine. The transmission is operably attached to both the electric motor/generator and the combustion engine via a planetary splitter and drives a differential. Additionally, the transmission is selectively attached to the output of the combustion engine via a lock-up clutch. The transmission uses multiple gear sets and clutches to achieve six forward speed ratios. First, second and third forward speed ratios are selectively achieved using one of the three drive gear sets while the planetary splitter is in a first mode. With the planetary splitter in a second mode, fourth, fifth and sixth forward speed ratios may be selectively achieved. It is also envisioned that the transmission of the present invention be adapted for use in a hybrid vehicle having a second electric motor/generator for driving a second differential, wherein the first electric motor/generator generates power for powering the second electric motor/generator, thus driving the hybrid vehicle at low speeds.

23 Claims, 2 Drawing Sheets

HYBRID AUTOMATED MANUAL TRANSMISSION

FIELD OF THE INVENTION

The present invention relates generally to hybrid vehicles and more particularly to an automated manual transmission for overcoming traditional and hybrid vehicle deficiencies.

BACKGROUND OF THE INVENTION

Automobile manufacturers continuously strive to improve the fuel efficiency of the vehicles they design. Fuel efficiency can be achieved through improvements in practically any feature of an automobile. Component weight, engine and transmission configuration and aerodynamics are just a few examples of the almost limitless areas increased efficiency can be achieved.

More recently, automobile manufacturers have ventured into the area of hybrid vehicles. A hybrid vehicle has both a traditional combustion engine and an electric motor/generator for driving the vehicle. A hybrid vehicle offers significantly increased fuel efficiency due to the assistance of the electric motor/generator. Although hybrid vehicles offer improved efficiency, the overall powertrain implemented with such a vehicle is still oversized for its application.

The powertrains of conventional and even hybrid vehicles are inefficient as they are designed to provide more power than required for the vehicle at cruising speeds. Specifically, the combustion engine of such powertrains is larger than required to provide power for acceleration and hill climbs. This extra power is not required for a vehicle once it is up to cruising speed. As a result, conventional vehicles are less efficient than desired.

Therefore, it is desirable in the industry to have an improved vehicle powertrain for implementation in a vehicle, such as a hybrid vehicle, which overcomes the inefficiencies inherent in a conventional powertrain.

SUMMARY OF THE INVENTION

In achieving the above identified objectives, the present invention provides an improved powertrain configuration comprising a split path transmission operable by a combustion engine and an electric motor/generator. The combustion engine drives the split path transmission while the electric motor/generator assists in such driving. In turn, the split path transmission communicates rotational motion to a rear differential for driving a pair of rear wheels. The split path transmission is operably attached to both an engine output and a first electric motor/generator by way of a planetary splitter and a lock-up clutch. A second electric motor/generator is implemented for driving a front differential. The split path transmission comprises three conventional plate clutches and three drive gear pairs for achieving six forward drive ratios. A reverse gear ratio is achieved using the first electric motor/generator. The first electric motor/generator initially generates power for powering the second electric motor/generator, for driving the vehicle at low speeds. It is also foreseen that the split path transmission may drive the front differential and the second electric motor/generator may drive the rear differential.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art.

DETAILED DESCRIPTION OF THE PREFERRED EMBODIMENT

At the outset, it is important to note that the herein described embodiment is a preferred embodiment and merely exemplary in nature. Being exemplary, the preferred embodiment is in no way intended to limit the invention or its application.

Figure 1:
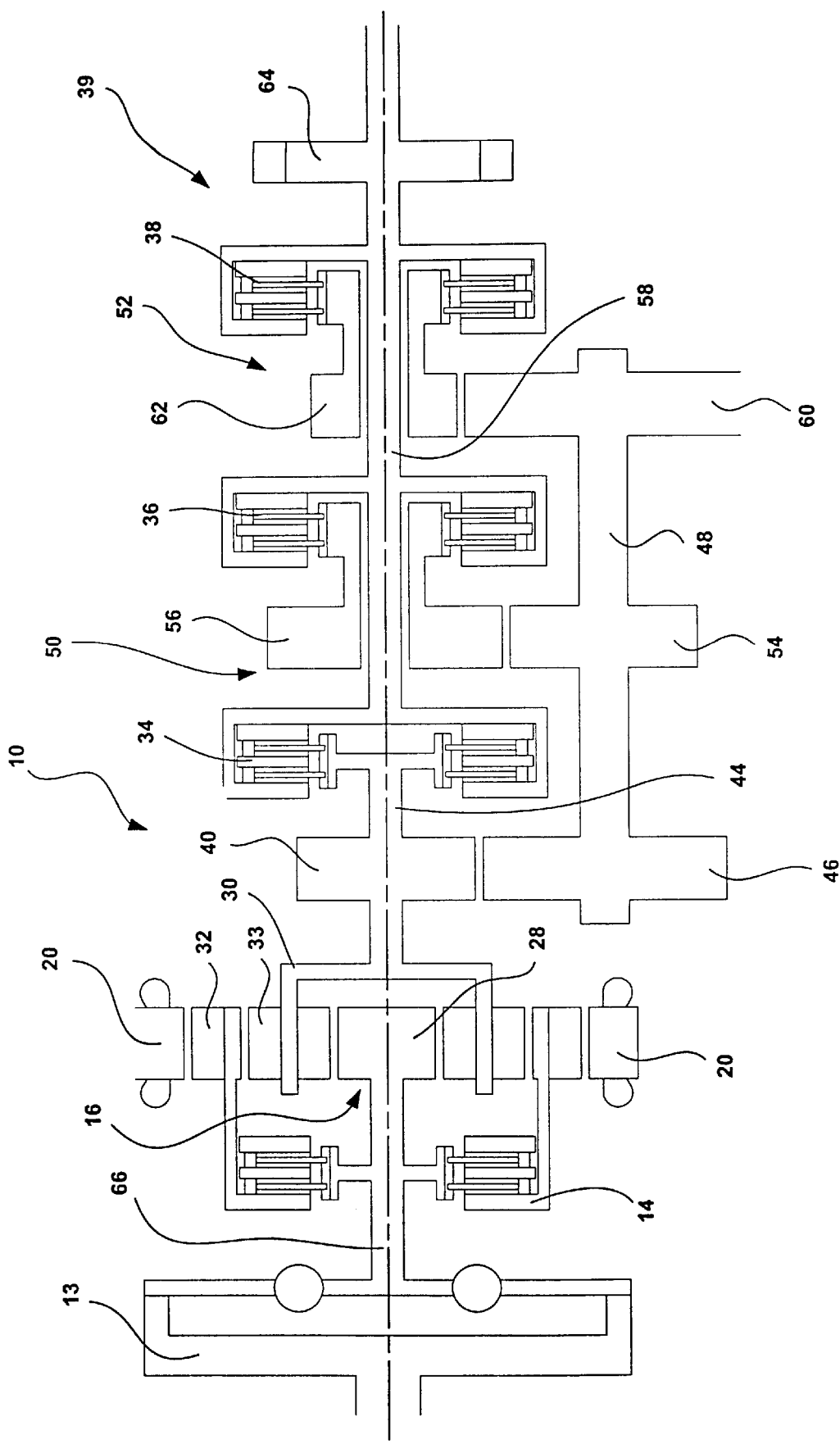
FIG. 1 is a schematic view of a split path transmission according to the principles of the present invention.

With reference to FIG. 1, a schematic view of a split path transmission 10 is shown. Split path transmission 10 includes a vibration damper connection 13 having a flywheel and dampening device, a lock-up clutch 14, a planetary splitter 16, a first electric motor/generator 20, a first multi-plate clutch 34, a second multi-plate clutch 36, a third multi-plate clutch 38, and a geartrain 39. Geartrain 39 includes a drive gear 40 fixed to an intermediate shaft 44, a driven gear 46 fixed to a layshaft 48 and meshed with drive gear 40, a first constant-mesh gearset 50 and a second constant-mesh gearset 52. First gearset 50 includes a first transfer gear 54 on layshaft 48 which is meshed with a first speed gear 56 rotatably supported on an output shaft 58. Likewise, second gearset 52 includes a second transfer gear 60 on layshaft 48 which is meshed with a second speed gear 62 rotatably supported on output shaft 58. A parking pawl 64 is fixed to output shaft 58.

An input shaft 66 is attached to a sun gear 28 of planetary splitter 16. Input shaft 66 is connected to an internal combustion engine 12 (see FIG. 2) via conventional vibration damper 13, such that sun gear 28 always runs at engine speed. A planet carrier 30 of planetary splitter 16 is attached to split path transmission 10 via intermediate shaft 44. A ring gear 32 of planetary splitter 16 is in operable communication with first electric motor/generator 20. A plurality of planet gears 33 are supported by planet carrier 30 in meshing engagement with sun gear 28 and ring gear 32. Ring gear 32 is selectively connectable to input shaft 66 via lock-up clutch 14.

Split path transmission 10 uses three conventional multi-plate clutches 34, 36, 38 to engage three different drive ratios. First multi-plate clutch 34 is provided between intermediate shaft 44 and output shaft 58 for providing a first drive ratio (1:1 direct ratio) when first multi-plate clutch 34 is engaged. Second multi-plate clutch 36 is operable to selectively couple first speed gear 56 to output shaft 58 for establishing a second drive ratio. Likewise, third multi-plate clutch 38 is operable to selectively couple second speed gear 62 to output shaft 58 for establishing a third drive ratio.

Because planetary splitter 16 comes before geartrain 39 in the power transfer path, clutches 14, 34, 36 and 38 can be selectively engaged to achieve a six speed transmission with reverse. As noted, transfer gears 54 and 60 are in constant mesh with speed gears 56 and 62 which are selectively engageable to output shaft 58. Each gear couple is capable of producing a forward drive ratio while engagement of clutch 34 provides a direct drive ratio of 1:1. In operation, first through third gears are achieved with planetary splitter 16 operating in a 'low' setting. The 'low' setting is defined with lock-up clutch 14 being in a disengaged state wherein ring gear 32 is permitted to rotate relative to sun gear 28. In contrast, fourth through sixth gears are achieved with planetary splitter 16 operating in a 'high' setting. The 'high' setting is defined when lock-up clutch 14 is in an engaged state. It is foreseen that lock-up clutch 14 could be controlled by a transmission controller (not shown) or other mechanism. By selectively engaging one of conventional multi-plate clutches 34, 36, 38, a gear ratio and drive path are produced.

Figure 2:
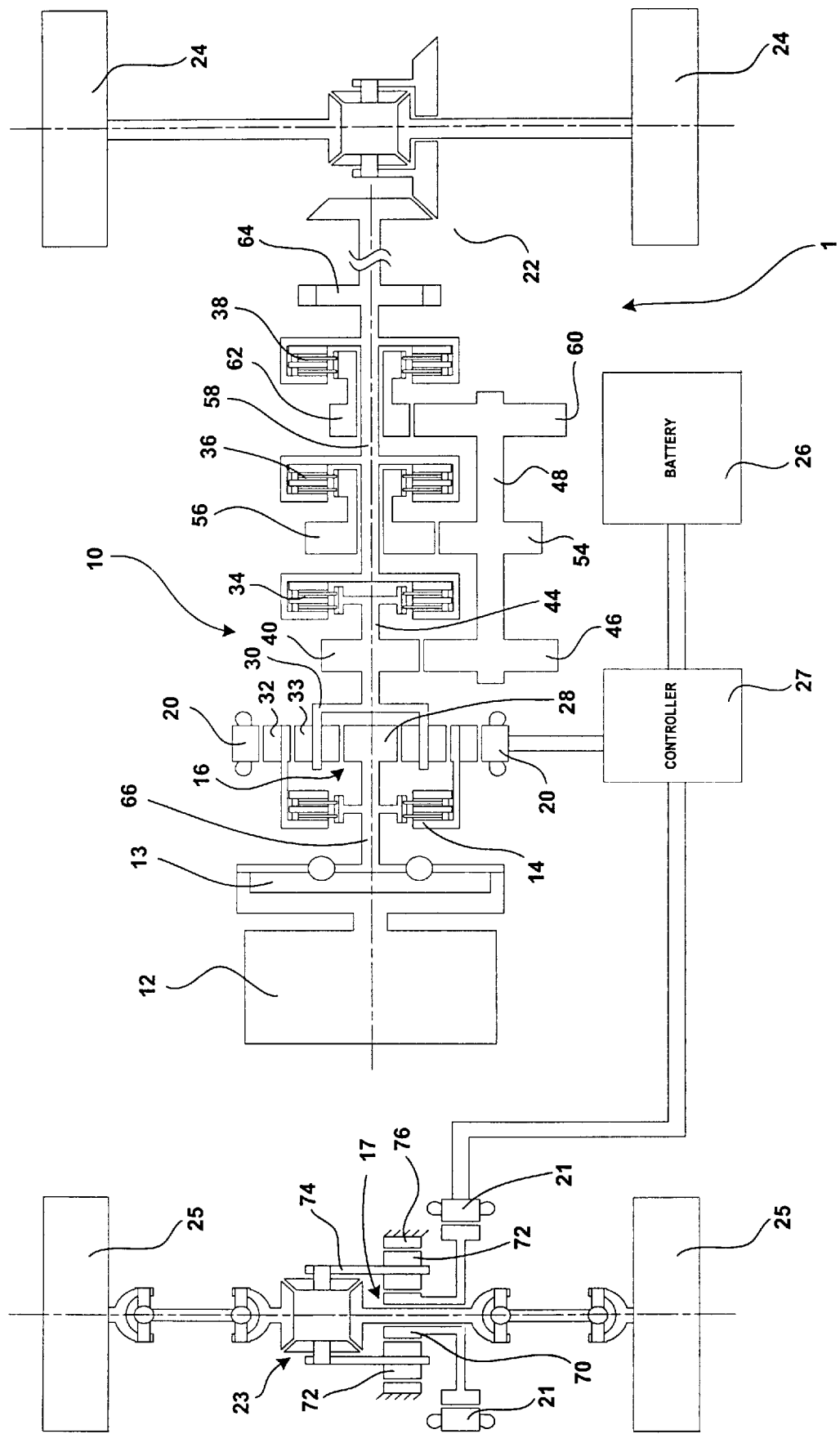
FIG. 2 is a schematic view of a hybrid vehicle implementing the split path transmission of the present invention.

In order to achieve reverse operation, first electric motor/generator 20 drives ring gear 32 in a reverse direction, faster than that of the output of the combustion engine 12 (see FIG. 2). The preferred embodiment achieves a 3.4:1 reverse ratio by driving ring gear 32 in a reverse direction at 750 rpm as compared to an opposite rotating output of 480 rpm of input shaft 66.

With reference to FIG. 2, a hybrid vehicle powertrain 1 is shown which utilizes split path transmission 10 of the present invention. Hybrid vehicle powertrain 1 includes combustion engine 12, a first differential 22 operably connected to output shaft 58 and a first pair of wheels 24, and a second differential 23 operably connected to a second pair of wheels 25. Second differential 23 is operably attached to a second electric motor/generator 21 via a planetary gearset 17. Planetary gearset 17 includes a sun gear 70 operably driven by second electric motor/generator 21. A plurality of planet gears 72 are supported on a carrier 74 and in meshing engagement with sun gear 70 and a fixed ring gear 76. Carrier 74 is in driving engagement with second differential 23. As such, second electric motor/generator 21 is operable to drive second differential 23. A battery 26 powers both first and second electric motor/generators 20, 21, as well as stores energy created by either generator 20 or generator 21 in a re-generation mode. A controller 27 is also provided for managing the operation of first and second electric motor/generators 20, 21 and possibly actuation of clutches 14, 34, 36 and 38.

When the vehicle is stationary, ring gear 32 rotates in an opposite direction to the engine output generating electric power. The generated electric power is fed to battery 26 and/or second electric motor/generator 21. If a small amount of electric power develops at first motor/generator 20 due to rotation of ring gear 32 then the reaction torque drives hybrid vehicle powertrain 1 at low speeds, simulating creep in an automatic transmission. The amount of electrical power required to achieve this is a function of various vehicle parameters, including but not limited to, weight. An increase in power of first electrical motor/generator 20 slows the rotation of ring gear 32 and causes the vehicle to accelerate. As the rotation of ring gear 32 approaches zero, a first planetary ratio is established. The first planetary ratio of the preferred embodiment is 2.9:1. In order to achieve a 1:1 ratio, lock-up clutch 14 is applied, providing a direct power transfer path between the output of engine 12 and ring gear 32. Once a 1:1 ratio is achieved, the assistance of electric power is no longer utilized and hybrid vehicle powertrain 1 achieves cruising speed.

It is also anticipated that the vehicle configuration will not be limited to split path transmission 10 only driving rear differential 22 and second electric motor/generator 21 driving front differential 23. In contrast, hybrid vehicle powertrain 1 can be configured such that split path transmission 10 drives front differential 23 and second electric motor/generator 21 drives rear differential 22.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A transmission for a vehicle, comprising:
   an input shaft;
   a planetary splitter having a first component driven by said input shaft;
   an intermediate shaft in driving engagement with a second component of said planetary splitter;
   a transfer gear supported for rotation by said intermediate shaft;
   a driven transfer gear supported on a layshaft in engagement with said transfer gear;
   an output shaft extending parallel to said layshaft; and
   at least one gearset selectively engageable for transmitting torque from said layshaft to said output shaft and including a drive gear fixedly mounted to said layshaft that is meshed with a driven gear rotatably mounted for selective engagement with said output shaft.

2. The transmission according to claim 1 further comprising an electric motor/generator operative to drive and be driven by a third component of said planetary splitter.

3. The transmission according to claim 1 further comprising a clutch for engaging two components of said planetary splitter together.

4. The transmission according to claim 2 wherein said electric motor/generator selectively drives said third component of said planetary splitter to establish a reverse drive ratio.

5. The transmission according to claim 1 wherein said at least one gearset includes a pair of gearsets each including a drive gear mounted to said layshaft and a driven gear mounted to said output shaft.

6. The transmission according to claim 2 further comprising a controller for selectively operating said electric motor/generator.

7. The transmission according to claim 6 further comprising a battery for powering said electric motor/generator and for storing energy produced by said electric motor/generator when said electric motor/generator is operated in a power generation mode.

8. A hybrid vehicle comprising:
   a combustion engine;
   a split path transmission operably driven by said combustion engine, said split path transmission including:
      an input shaft;
      a planetary splitter having a first component driven by said input shaft;
      an intermediate shaft in driving engagement with a second component of said planetary splitter;
      a transfer gear supported for rotation by said intermediate shaft;
      a driven transfer gear supported on a layshaft in engagement with said transfer gear;
      an output shaft extending parallel to said layshaft; and
      at least one gearset selectively engageable for transmitting torque from said layshaft to said output shaft and including a drive gear fixedly mounted to said layshaft that is meshed with a driven gear rotatably mounted for selective engagement with said output shaft.

9. The hybrid vehicle according to claim 8 further comprising an electric motor/generator operative to drive and be driven by a third component of said planetary splitter.

10. The hybrid vehicle according to claim 8 further comprising a clutch for engaging two components of said planetary splitter together.

11. The hybrid vehicle according to claim 9 wherein said electric motor/generator selectively drives said third component of said planetary splitter to establish a reverse drive ratio.

12. The hybrid vehicle according to claim 8 wherein said at least one gearset includes a pair of gearsets each including a drive gear mounted to said layshaft and a driven gear mounted to said output shaft.

13. The hybrid vehicle according to claim 9 further comprising a controller for selectively operating said electric motor/generator.

14. The hybrid vehicle according to claim 13 further comprising a battery for powering said electric motor/generator and for storing energy produced by said electric motor/generator when said electric motor/generator is operated in a power generation mode.

15. The hybrid vehicle according to claim 9 further comprising a second electric motor/generator operative to drive a pair of wheels of the hybrid vehicle.

16. A transmission for a vehicle, comprising:
an input shaft;
a planetary splitter having a first component driven by said input shaft;
an intermediate shaft in driving engagement with a second component of said planetary splitter;
a drive gear supported for rotation by said intermediate shaft;
a driven gear supported on a layshaft in engagement with said drive gear;
an output shaft extending parallel to said layshaft;
a clutch for engaging said output shaft directly to said intermediate shaft for rotation therewith; and
at least one gearset selectively engageable for transmitting torque from said layshaft to said output shaft.

17. The transmission according to claim 16 further comprising an electric motor/generator operative to drive and be driven by a third component of said planetary splitter.

18. A hybrid vehicle powertrain comprising:
a combustion engine;
a split path transmission operably driven by said combustion engine, said split path transmission including an output shaft;
a first electric motor/generator drivingly connected to a component of said split path transmission;
a first differential operably connected to said output shaft and a first pair of wheels;
a second differential having an input and a pair of outputs operably connected to a second pair of wheels;
a planetary gearset including a first component in driving engagement with said input of said second differential, and
a second electric motor/generator drivingly connected to a second component of said planetary gearset.

19. The hybrid vehicle according to claim 18 wherein said split path transmission comprises:
an input shaft;
a planetary splitter having a first component driven by said input shaft;
an intermediate shaft in driving engagement with a second component of said planetary splitter;
a transfer gear supported for rotation by said intermediate shaft;
a driven transfer gear supported on a layshaft in engagement with said transfer gear, said output shaft extending parallel to said layshaft; and
at least one gearset selectively engageable for transmitting torque from said layshaft to said output shaft.

20. The hybrid vehicle according to claim 19 wherein said planetary gearset includes a plurality of planet gears supported on a carrier, said plurality of planet gears meshed with a sun gear and a ring gear, said carrier in driving engagement with said input of said second differential.

21. A transmission for a vehicle having an engine and a driveline, comprising:
an input shaft adaptive to be driven by the engine;
an output shaft adapted to drive the driveline;
a planetary gearset including a sun gear driven by said input shaft, a ring gear, and a set of planet gears meshed with said sun gear and said ring gear, said planet gears rotatably supported on a carrier;
an intermediate shaft driven by said carrier;
a layshaft driven by said intermediate shaft;
a first constant-mesh gearset selectively engageable for transmitting torque from said layshaft to said output shaft;
an electric motor/generator operative to drive or be driven by said ring gear;
a first clutch operable in an engaged mode to couple said ring gear for common rotation with said sun gear to define a first speed ratio between said input shaft and said intermediate shaft, and operable in a released mode to permit relative rotation between said ring gear and said sun gear to define a second speed ratio between said input shaft and said intermediate shaft; and
a second clutch operable in an engaged mode to couple said output shaft for common rotation with said intermediate shaft and in a released mode to permit relative rotation therebetween.

22. The transmission of claim 21 wherein said first gearset includes a first transfer gear fixed to said layshaft and a first speed gear rotatably supported on said output shaft, and further comprising a third clutch for selectively coupling said first speed gear to said output shaft.

23. A transmission for a vehicle comprising:
an input shaft;
a planetary splitter having a first component driven by said input shaft;
an intermediate shaft driven by a second component of said planetary splitter;
a layshaft driven by said intermediate shaft;
an output shaft; a
gearset selectively engageable for transmitting torque from said layshaft to said output shaft; and
an electric motor/generator operative to drive or be driven by a third component of said planetary splitter to establish a reverse drive ratio.

* * * * *